Jan. 12, 1965   M. S. MARKOWICZ   3,165,433
APPARATUS TO TRIM RESIN FROM THE EDGE OF LAMINATED SHEETS
Filed April 20, 1962
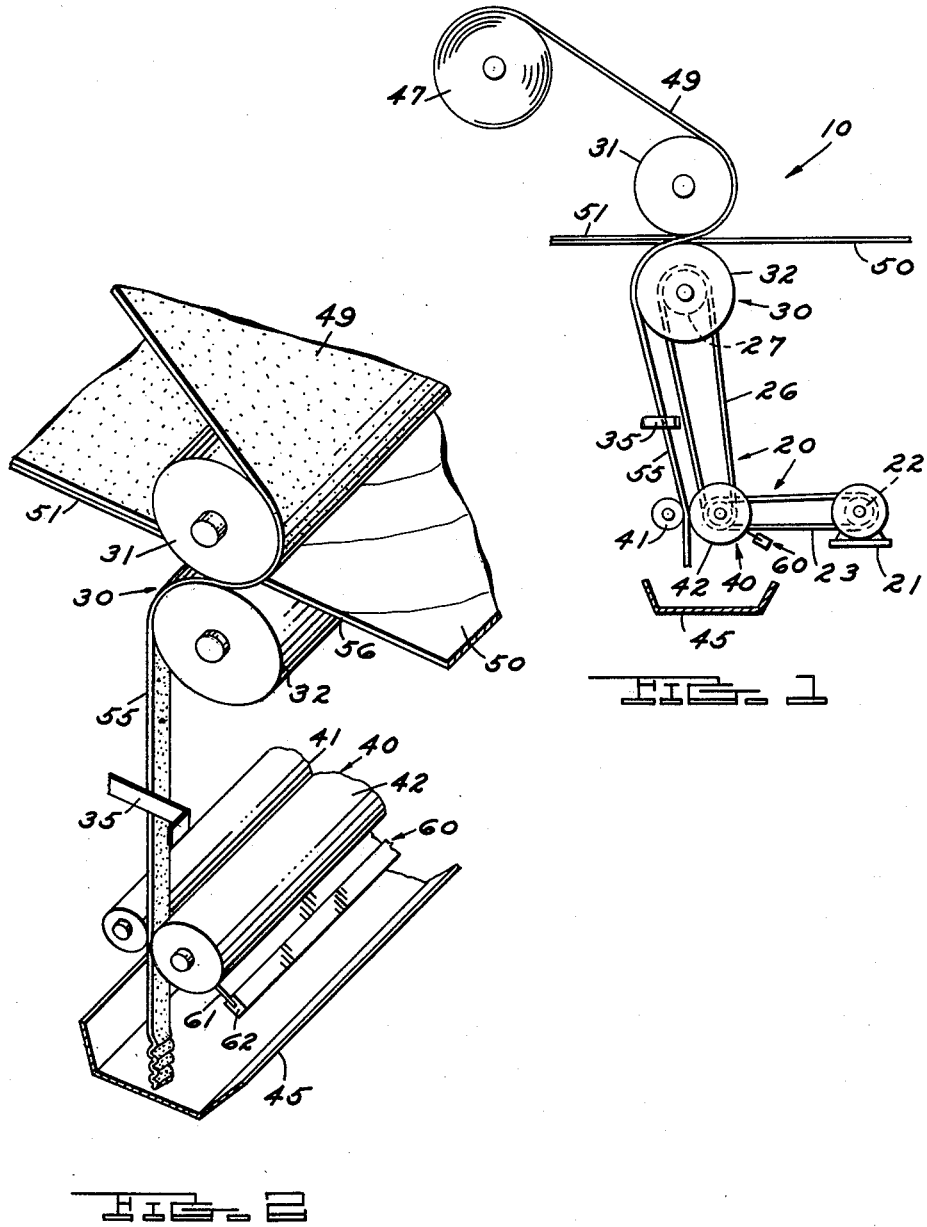
MARTIN S. MARKOWICZ
INVENTOR.
BY John R. Faulkner
Thomas H. Oster
ATTORNEYS

United States Patent Office 3,165,433
Patented Jan. 12, 1965

3,165,433
APPARATUS TO TRIM RESIN FROM THE EDGE OF LAMINATED SHEETS
Martin S. Markowicz, Detroit, Mich., assignor to Ford Motor Company, Dearborn, Mich., a corporation of Delaware
Filed Apr. 20, 1962, Ser. No. 189,078
5 Claims. (Cl. 156—271)

This invention relates to the laminating of a sheet material with a covering material. More particularly, this invention relates to the laminating of a metallic sheet material with a thermo-plastic covering material such as vinyl.

Existing methods of covering such materials as sheet steel with thermo-plastic materials, such as vinyl, involve coating the sheet steel with an adhesive and then placing the vinyl sheet on the adhesive coated sheet steel under the pressure of a pair of laminating rolls. Any surplus vinyl is then trimmed from the sheet steel manually by the use of one of the commonly known shearing devices. The utilization of such a trim method involves a considerable amount of labor and develops a sizable quantity of scrap material.

The instant invention is directed toward the elimination of labor and the minimization of scrap in performing the trimming operation. The preferred embodiment of the invention utilizes a pair of secondary or trimming rolls which cooperate with the laminating rolls and operate at surface speeds greater than that of the laminating rolls. The trimming rolls have a strip of vinyl scrap threaded through them from the laminating rolls so that the higher speed of the trimming rolls causes a force to be exerted on the strip of vinyl. The force is exerted on the vinyl strip in such a way that the edge of the sheet steel which may be hot severs any excess vinyl from the covered sheet of steel. In this manner the trimming of the vinyl clad steel is performed automatically with a minimum of waste. Further, since the vinyl is guided through the trimming rolls, it is only necessary to align the sheet material with the vinyl, thus facilitating alignment of the vinyl and the sheet steel.

The object of this invention is the provision of an automatic method of trimming a covering material from a sheet material.

Another object of this invention is the provision of a means for automatically trimming a thermo-plastic material from a sheet material covered with such a thermo-plastic material.

Other objects and advantages will become obvious as the detailed specification is read in conjunction with the drawings, wherein:

FIGURE 1 is a schematic side view of the preferred embodiment of the invention; and FIGURE 2 is a front perspective view of the preferred embodiment of the invention.

Referring to FIGURE 1, the laminating machine 10 comprises a drive means 20, a laminating roll means 30, a guide means 35, a trimming roll means 40, a scrap bin 45 and a covering material supply roll 47. The driving means 20 includes a motor 21 which is drivingly connected to the trim roll means 40 and the laminating roll means 30. In the preferred embodiment, sprocket 22, chains 23 and sprocket 24 form the driving connection between the motor 21 and the trim roll means 40 while the sprocket 24, chain 26 and the sprocket 27 form the driving connection between the trim roll means and the laminating roll means. The sprockets 22, 24 and 27 are proportioned so the motor 21 drives the laminating roll means 30 at one surface speed while the trim roll means 40 is driven at a greater surface speed.

The laminating roll means 30 comprises two rolls 31 and 32 which are constructed to receive a covering material from the covering material supply roll 47 and a sheet material 50 which may be coated with an adhesive. The laminating rolls 31 and 32 exert a pressure on the covering material 49 and the adhesive coated sheet material 50, thereby causing said sheet material 50 to be covered with the covering material 49 to form a covered sheet material 51. The covering material 49 may be a thermo-plastic or more particularly a vinyl covering material while the sheet material 50 may be a metallic material or more particularly hot sheet steel.

The trim roll means 40 comprises rolls 41 and 42 which are located below the laminating roll means 30. A strip of excess or scrap covering material 55 is threaded from the laminating rolls 31 and 32 to the trim rolls 41 and 42 by a guide means 35. The guide means 35 may be a channel member which can be adjusted to cause the strip of excess covering material 55 to move in a selected vertical path relative to the edge 56 of the sheet material 50.

A scrap bin 45 is located beneath the trim roll means 40 to receive the strip of excess covering material 55. A scraper means 60 such as flexible scraper blade 61 having a holder 62 is located adjacent the roll 42 to clean any foreign matter from the surface of the roll 42. Any foreign matter which is scraped from the roll 42 by the scraper means 60 tends to deposit in the scrap bin 45.

In operation, the covering material 49 and the sheet material 50 is threaded through the laminating roll means 30 and a strip of excess covering material is threaded from the laminating roll means 30 through the trim roll means 40. Following the initial threading of the strip of excess covering material, the guide means 35 cooperating with the trim roll means 40 will tend to maintain the covering material 47 in proper alignment with laminating roll means 30. Thus it is only necessary to align the sheet material 50 with the covering material 49 or with the laminating roll means 30. The drive means 20 causes the covered sheet material to be moved at one surface speed while the excess covering material 55 is driven at a greater surface speed. The greater surface speed of the excess covering material 55 urges scrap 55 downwardly and against the edge of the sheet material 50 or the covered sheet material 51, thereby severing the excess covering material from the covered sheet material.

It should be noted that the guide means 35 and the trim roll means 40 cooperate to determine the extent to which the strip of excess covering material 55 is urged against the edge 56 of the covered sheet material 51. Further, the sheet material 50 may be hot when fed into the laminating roll means 30. The heat of the sheet material 51 will warm a covering material such as vinyl and thereby facilitate the severing of the excess covering material from the covered sheet material.

A typical set of operating conditions that has proven successful, but not critical are:

(a) The temperature of sheet steel may be 400–450° F.;
(b) The temperature of excess covering material may be 150–175° F.;
(c) The pressure which the laminating rolls exert on the covering material and the sheet steel may be 40–50 #/ft.;
(d) The pressure which the trim rolls exert on the strip of excess covering material is 20–40 #/ft., which may be varied to accommodate a variety of vinyl conditions;
(e) The surface speed of the laminating rolls is 15–25 feet per minute, depending on the laminate being processed;

(f) The surface speed of the trim rolls may be 25% faster than the laminating rolls.

The invention hereinbefore described has enabled a reduction of manpower freeing two men for more skilled tasks. Further, the scrap generated at the laminating rolls has been virtually eliminated with the exception of the strip of scrap material threaded through the trim rolls.

It will be understood that the invention is not to be limited to the exact construction shown and described and that various changes and modifications may be made without departing from the spirit and scope of the invention, as defined in the appended claims.

I claim:

1. The method of covering a sheet material having a longitudinally extending edge which comprises causing a strip of covering material to be placed on said sheet material so as to extend over said edge, causing the portion of covering material placed on said sheet material to be moved at a first speed, and causing the excess covering material extending over said edge to be moved at a speed greater than said first speed in a direction away from said sheet material whereby said strip is pulled against said edge and separated along said edge, said edge being sufficiently rigid to assist the divergent movements of said excess covering material and said portion in effecting separation of said strip.

2. The method of coverinng a sheet material having a longitudinally extending edge and simultaneously trimming excess covering material therefrom which comprises causing a strip of covering material to be placed on said sheet material so as to form a covered sheet material and to extend over said edge, causing said covered sheet material to be moved at a first surface speed, and causing the excess covering material extending over said edge to be moved at a speed greater than said first speed in a direction away from said covered sheet material whereby said strip is pulled against said edge and separated along said edge, said edge being sufficiently rigid to assist the divergent movements of said excess covering material and said covered sheet material in effecting separation of said strip.

3. The method of covering a hot sheet material having a longitudinally extending edge and simultaneously trimming excess covering material therefrom which comprises causing a strip of covering material to be placed on said hot sheet material so as to form a hot covered sheet material and to extend over said edge, causing said covered sheet material to be moved at a first surface speed, and causing the excess covering material extending over said edge to be moved at a speed greater than said first speed in a direction away from said covered sheet material whereby said strip is pulled against said edge and separated along said edge, said edge being sufficiently rigid to assist the divergent movements of said excess covering material and said covered sheet material in effecting separation of said strip.

4. The method of covering a hot sheet material having a longitudinally extending edge with thermoplastic covering material and simultaneously trimming excess covering material therefrom which comprises causing a strip of thermo-plastic covering material to be placed on said hot sheet material so as to form a hot covered sheet material and to extend over said edge, causing said covered sheet material to be moved at a first surface speed, and causing the excess covering material extending over said edge to be moved at a speed greater than said first speed in a direction away from said covered sheet material whereby said strip is pulled against said edge and longitudinally separated along said edge, said edge being sufficiently rigid to assist the divergent movements of said excess covering material and said covered sheet material in effecting separation of said strip.

5. The method for covering a metal sheet having a longitudinally extending edge and simultaneously trimming excess covering material therefrom which comprises causing a strip of covering material to be placed on said metal sheet so as to form a covered metal sheet and to extend over said edge, causing said covered metal sheet to be moved at a first surface speed, and causing the excess covering material extending over said edge to be moved at a speed greater than said first speed in a direction away from said covered metal sheet whereby said strip is pulled against said edge and separated along said edge, said edge being sufficiently rigid to assist the divergent movements of said excess covering material and said covered metal sheet in effecting separation of said strip.

References Cited in the file of this patent

UNITED STATES PATENTS

| | | |
|---|---|---|
| 876,008 | Overbury | Jan. 7, 1908 |
| 1,763,227 | Elmendorf | June 10, 1930 |
| 2,021,095 | Ball | Nov. 12, 1935 |
| 2,258,428 | Stalder | Oct. 7, 1941 |
| 2,587,634 | Lilley | Mar. 4, 1952 |
| 2,779,387 | Schairer | Jan. 29, 1957 |
| 2,891,022 | Lundsager | Nov. 18, 1958 |
| 3,028,061 | Fleming | Apr. 3, 1962 |
| 3,032,459 | Uhleen | May 1, 1962 |